United States Patent [19]

Roesel, Jr. et al.

[11] 4,177,414

[45] Dec. 4, 1979

[54] CONTROLLABLE VOLTAGE A.C. GENERATOR SYSTEM

[75] Inventors: John F. Roesel, Jr., Bradenton; Richard R. Ott, Sarasota; Ronnie J. Barber, Bradenton, all of Fla.

[73] Assignee: Precise Power Corporation, Bradenton, Fla.

[21] Appl. No.: 862,813

[22] Filed: Dec. 21, 1977

[51] Int. Cl.² .............................................. H02P 9/42
[52] U.S. Cl. ........................................ 322/28; 307/78; 307/84; 322/32; 322/61
[58] Field of Search ...................... 307/78, 84; 322/20, 322/28, 29, 32, 61, 47; 323/10–12

[56] References Cited

U.S. PATENT DOCUMENTS

| | | | |
|---|---|---|---|
| 3,185,857 | 5/1965 | Johnson | 322/61 X |
| 3,521,149 | 7/1970 | Roesel, Jr. | 322/47 |
| 3,544,883 | 12/1970 | Milne | 323/10 |
| 3,931,535 | 1/1976 | Roesel, Jr. | 322/47 X |

Primary Examiner—Robert J. Hickey
Attorney, Agent, or Firm—Frederick Shapoe

[57] ABSTRACT

This invention relates to a generator system for generating a readily controllable A.C. of a selected potential and of a substantially constant selected frequency, which system comprises a first, or master, rotary generator producing an A.C. potential of substantially constant frequency and at least one other, or slave, rotary generator producing an A.C. potential of a frequency identical to that of the first generator, the A.C. potential outputs of all the generators being combined in series, and electrical means for shifting the phase of the A.C. potential of the slave generator with respect to the phase of the A.C. potential master generator whereby the resultant combined A.C. outputs constitute an A.C. potential of the selected value and being of the substantially constant selected frequency. Each of the generators is preferably of the type having a field core of soft magnetic material having a cylindrical surface upon which is placed a layer of magnetizable permanent magnetic material, and a juxtaposed wound stator having a matching cylindrical surface, has an excitation coil which can affect the layer of permanent magnetic material when energized with A.C. potential so that it will produce a pattern of north and south magnetic poles in the layer of permanent magnetic material in the adjacent field core and such pattern will induce an A.C. potential in primary windings in the stator as the so magnetized field core moves with respect to the stator. The means for shifting the phases of the A.C. potentials of the generators is accomplished by shifting the phase of the A.C. excitation potential to one of the excitation coils, both excitation coils being energized by A.C. potentials with otherwise identical frequency.

13 Claims, 8 Drawing Figures

CONTROLLABLE VOLTAGE A.C. GENERATOR SYSTEM

PRIOR ART

The present invention is an improvement on the inventions set forth in U.S. Pat. Nos. 3,521,149 issued July 21, 1970 and 3,931,535 issued Jan. 6, 1976. The present invention is also an improvement over the invention disclosed in copending U.S. Pat. application Ser. No. 844,597, filed Oct. 25, 1977 in the name of John F. Roesel, Jr., and entitled "Non-Interruptible Power Supply Systems." None of these patents and patent application discloses the important features of controllably phase shifting one of the two A.C. generator outputs of identical frequencies and combining the outputs in series in order to secure a combined resultant A.C. potential of a selected value that can be readily maintained substantially constant.

BACKGROUND OF THE INVENTION

It is highly desirable to have available in an A.C. rotating generator system a means for effecting good control or regulation of the A.C. voltage output thereof over a wide range of voltages with very low dissipated power losses due to the voltage control or regulating means therefor. It also would be desirable that the voltage control operate rapidly, and particularly that the regulation or control be effective in a period of the order of one cycle, whereby to attain or maintain a selected voltage.

While many expedients and techniques are known for regulating and controlling the voltage of an A.C. generator, substantially all such known expedients or techniques incur significant power losses or power dissipation. Further, in many such voltage control systems the controls operate relatively slowly, so that many cycles of A.C. of incorrect voltage are generated before the A.C. voltage reaches the desired value.

For many applications in laboratories, industry, military and government, it is desirable to have available a supply of A.C. power at a specified substantially constant voltage and at a substantially constant selected frequency. Public utility power systems are characterized by many voltage irregularities and faults as well as complete power interruptions which may extend from a few cycles to several hours or longer. It is common for substantial voltage drops to occur in utility lines, often at certain times of the day, with 10% variations in voltage being normal from the low to the high values of A.C. line input to homes and business establishments. In an article entitled "Focus on Uninterruptible Power Supplies and Inverters" appearing in part on pages 100 and 101 of the May 10, 1975 issue of "Electronic Design," there are listed the types and frequency of occurrence of many of these public utility irregularities and faults. In an article on pages 38 to 45 of the July 1977 issue of "Mini-Micro Systems" entitled "Power Protection Equipment: A Survey" by Kenneth G. Brill, some details of the nature and frequency of utility power problems are set forth and their effect on computer operation. This article also lists the protection alternatives available to secure constant voltage A.C. as well as other desirable characteristics of power sources, particularly for computers.

Numerous other electronically controlled apparatus, other than computers, requires A.C. power of a relatively constant frequency and a relatively constant selected voltage in order to function properly. If either the frequency or the voltage, or both, depart from prescribed limits, many machines, apparatus, and control equipment in factories, laboratories, hospitals, military installations, communications such as radio, television and telephony, and the like, can malfunction or misfunction with consequential losses, interruptions of processes and procedures, physical damage and dangerous conditions occurring.

SUMMARY OF THE INVENTION

In accordance with this invention it has been discovered that excellent voltage control of an A.C. generator system, based on rotating generators producing sinusoidal A.C. potentials, both single phase and polyphase, can be obtained over an extremely wide range of voltages with substantially no significant dissipative power losses. Such voltage control is obtainable so that the A.C. voltage can be held to a substantially constant selected value within the wide range and maintained with a rapid response to changes resulting from load variations, temperature changes, and the like. The selected frequency of the A.C. output is also maintained substantially constant by the generator system.

The generator system of this invention employs a first or master A.C. generator and at least one other co-operating A.C. generator which latter is hereinafter designated a slave generator, and both generators are constructed and operated to produce sine wave A.C. potentials of identical frequency. The outputs of the master and slave generators are connected in series and the resultant sine wave A.C. potential is supplied to a load. In order to control the resultant voltage to the load to a desired selected value, the A.C. output of the slave generator is caused to shift in phase with respect to the phase of the A.C. potential generated by the master generator and, since the peak potentials add vectorially in a series connection, the combined peak voltage is directly determined by the extent of the phase shifting. The phase shifting can be readily and precisely controlled in the present system by electronic means with a high degree of precision and within about one cycle, though it can be adjusted to 2, 3 or more cycle response periods. No dissipative power losses occur in the phase shifting procedure nor do any dissipative losses occur in the combining of the two A.C. potentials into a single resultant A.C. output.

In order to obtain a precisely controlled frequency of the A.C. output from the rotating generators for practicing the invention, there are employed generators of the type set forth in Roesel U.S. Pat. Nos. 3,521,149; 3,931,535 and in the co-pending Roesel U.S. patent application above referred to. These generators comprise (1) a field core of soft magnetic material having a cylindrical surface on which is applied a layer of magnetizable permanent magnetic material and (2) a juxtaposed stator core of soft magnetic material having a cylindrical surface matching that in the field core with an excitation coil in the cylindrical surface of the stator, the excitation coil being energized by an A.C. potential so that it will magnetize the adjacent layer of the permanent magnetic materials in the field core into a pattern of north and south magnetic poles when the field revolves with respect to it. The combination of the layer of permanent magnetic material magnetized into a pattern of magnetic poles on the body of high permeability soft magnetic material of the field core results in a strong patterned magnetic field being formed. When the so magnetized field core keeps on rotating it will induce in the primary windings in the stator an A.C. potential of an identical frequency to that supplied to the excitation coil. The excitation coils of both the master and slave generators are supplied A.C. potentials of identical frequency from a common frequency source, and thus both will generate A.C. potentials of identical frequency. However, the A.C. potential to the excitation coil of the slave generator is phase shifted and consequently the A.C. potential output thereof is also phase shifted as compared to the A.C. potential output of the master generator.

The control means to accomplish the phase shifting of the A.C. potential supplied to the excitation coil in the slave generator comprises a means for sensing the voltage of the resultant sine wave A.C. potential of the combined series outputs of the master and slave generators, determining the magnitude and direction of this value with respect to a desired voltage, producing an electrical signal proportional to any difference, and applying this electrical difference signal to electrical means to phase shift unidirectional square wave complimentary pulses coming from a common oscillator divider; the unshifted pulses from the oscillator divider first operates a driver and a D.C. to A.C. inverter to produce A.C. potentials for energizing the excitation coil of the master generator, while the shifted pulses produce from a slave driver and D.C. to A.C. inverter a phase shifted A.C. potential to energize the excitation coil of the slave generator.

The means for sensing the voltage of the combined resultant sine wave A.C. potential of the master and slave generators measures the voltage peak of one sine wave at the one-quarter point of a full cycle after the zero point and ordinarily is measured at each cycle, but it can be set to measure the voltage at only every second, third or later cycle. This enables more rapid as well as more accurate voltage measurements than when using means for measuring RMS voltage value. The voltage sensing means applied to the resultant A.C. potential output comprises a first electronic means, which is operable to function at the moment when the sine wave passes from a negative value through the zero value, and starts operation of a one-quarter cycle time means, which triggers at the conclusion of the one-quarter cycle a short pulse, for instance a 5 to 15 microsecond pulse for a desired 50 Hz to 400 Hz A.C. output, which short pulse is almost precisely at the relatively flat peak in the loop of the sine wave. This short pulse, in a sense, is like a window, and is coupled to energize an electrical means for measuring the voltage during this interval of the A.C. sine wave, and the electrical voltage measuring means causes a continuous direct current signal of a magnitude directly proportional to the measured peak voltage to flow until the next A.C. sine wave arrives. This direct current signal is conveyed to an electronic comparator means which includes a settable voltage reference means, and the comparator means compares the direct current signal with the reference means, determines if it is within an acceptable range, and generates an error signal if the voltage is outside this acceptable range.

The amplified error signal is conveyed to a phase shifting means which concurrently receives unidirectional square wave complementary timing pulses from a common oscillator divider means and phase shifts such timing pulses by an amount corresponding to the error signal and transmits the phase shifted timing pulses to a slave driver unit which in turn energizes an D.C. to A.C. inverter, which generates the phase shifted A.C. to be supplied to the excitation coil of the slave generator. The common oscillator divider also concurrently supplied the identical unidirectional square wave complementary timing pulses to the master driver unit which in turn energizes the D.C. to A.C. inverter for supplying A.C. potentials to the excitation coil for the master generator.

DETAILED DESCRIPTION OF THE INVENTION

Figure 1:
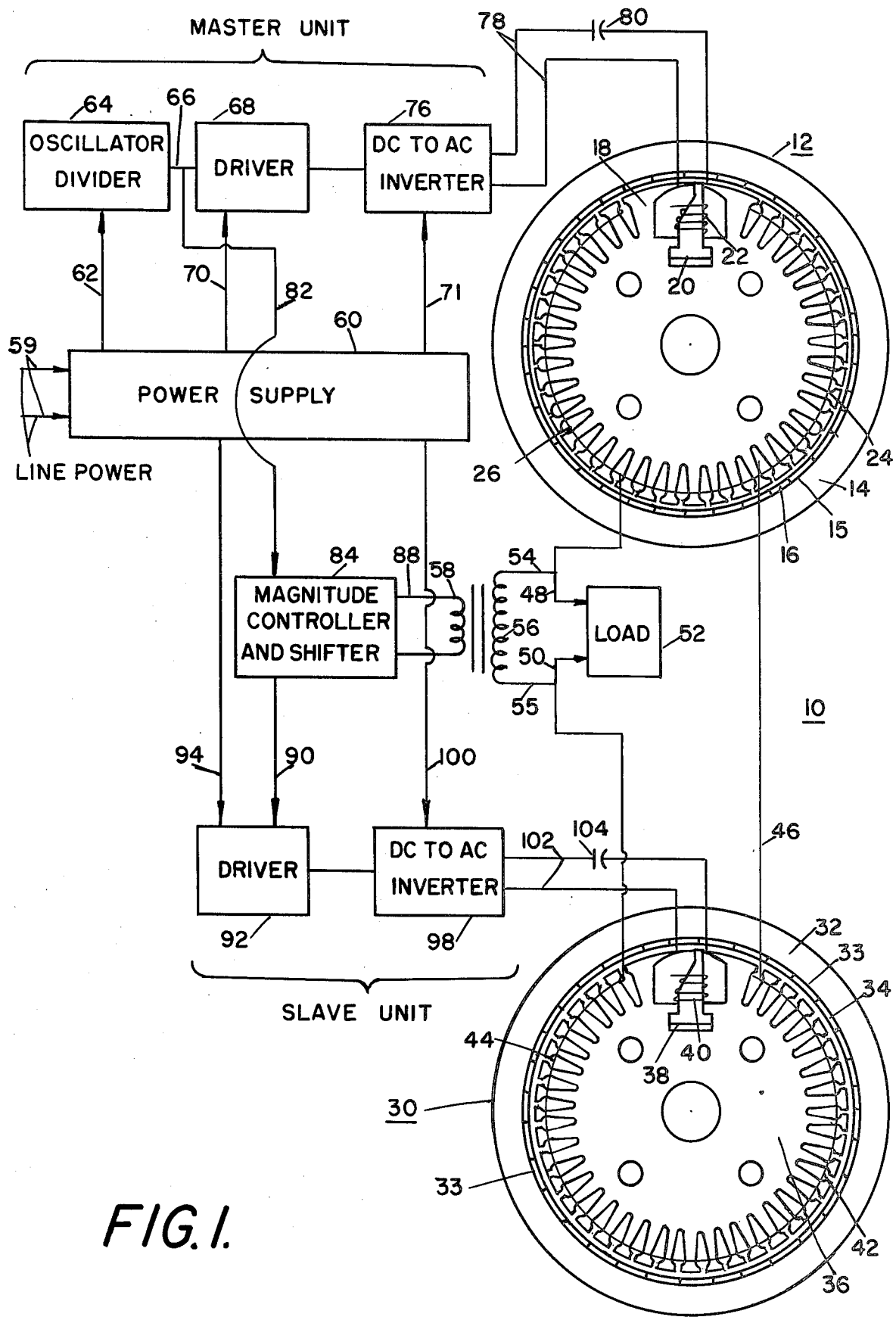
FIG. 1 is a schematic view and block circuit diagram of one form of the invention.

Referring to FIG. 1 of the drawing, there is illustrated a generator system 10 for practicing the invention. A first or master A.C. generator 12 comprises a field core 14 of a soft magnetic material of high permeability, such as a body of laminations of 3% silicon steel, having an inner cylindrical surface 15 to which is applied a layer 16 of a magnetizable permanent magnetic material such as barium ferrite or other ferrite. Disposed coaxially within the cylindrical surface 15 of the field core 14 is a juxtaposed stator 18 comprising a plurality of laminations of a soft magnetic steel of high permeability, for example 3% silicon steel. Means (not shown) such as a motor supplied power from a utility line, are provided for causing the field core 14 to move with respect to the stator 18, preferably by rotating the field core while the stator remains stationary. The outer periphery of the stator is slotted and has a plurality of teeth and slots in which are disposed a series of windings. A relatively large pole 20 is present at one point on the periphery and placed about it is an excitation coil 22 which when energized with A.C. potential will develop a high magnetic flux density at the tip of the pole 20, so that as the field core rotates the adjacent layer 16 of permanent magnetic material will be magnetized to form a pattern of north and south magnetic poles at a high remanent flux density. A series of primary windings 24 and 26 are disposed in other slots of the stator 18 and they will generate A.C. potentials as the thus magnetized field rotates about the stator.

At least one other A.C. generator 30, which will be hereinafter referred to as the slave generator, is associated with the master generator 12. The slave generator 30 can be mounted on the same shaft as the master generator and be driven by the same motor, or it can be entirely separate and even be driven by another motor at a speed different from that driving the master generator. The slave generator 30 comprises a field core 32 of soft magnetic material of high permeability such as laminations of 3% silicon steel, and has a cylindrical surface 33 to which is applied a layer 34 of magnetizable permanent magnetic material similar to layer 16. A slotted stator 36 has a core of soft magnetic material such as 3% silicon steel laminations, which has a large pole 38 on which is wound an excitation coil 40 which when energized with an A.C. potential will develop a high magnetic flux at the tip of the pole 38, such that as the field core rotates about the stator, the adjacent layer 34 of permanent magnetic material will be magnetized to form a pattern of north and south magnetic poles at a high remanent flux density. Primary windings 42 and 44 in slots in the stator 36 will have an A.C. potential generated therein by the movement of the magnetized field with respect thereto.

The primary windings 24 and 26 in the master generator 12, and the primary windings 42 and 44 in the slave generator 30 are shown only schematically, but their number and arrangement are such that they can each generate any one of single phase, two phase, three phase or higher polyphase A.C. potentials. However, each must generate A.C. of the same type phase in order to be useful in practicing the invention. More than one slave generator can be used with a master generator. If two generators constitute a master and slave system, then they are preferably, but not necessarily, each capable of generating the same or nearly the same A.C. potential. When three generators are combined into one system, then the two slave generators are each preferably designed to generate nearly the same A.C. potential, and the total potential of both the slave generators preferably should be, but not necessarily, about the same as the A.C. potential output of the master generator alone.

As shown in FIG. 1, the primary windings 24 and 42, which for simplicity are a single phase, are connected in series, while output leads 48 and 50 from primary windings 26 and 44 go to a load 52. Two output leads 48 and 50 are depicted for simplicity of illustration and for understanding the invention, and they would be used for single phase A.C. potential output. For a three phase output, three leads obviously would be present, along with a common neutral lead.

In order to obtain a feedback of the A.C. potentials of the generators to the control means, leads 54 and 55 are connected to the generator output leads 48 and 50 to supply the A.C. potentials thereof to the primary winding 56 of a transformer provided with a secondary winding 58 supplying A.C. potential to a controller and shifter unit 84. Leads 59 connected to a utility line, or other source of electrical energy, supply power to a power supply unit 60. Alternatively, leads 59 can be connected to another secondary winding energizable with A.C. from the primary winding 56, in order to avoid output failure of the generator system 10 when the utility power to the motor driving generators 12 and 30 and to the power supply unit 60 is briefly interrupted. In this last arrangement the generators 12 and 30 will produce A.C. power even when the utility power to the generator system is interrupted, since the inertia of the rotating masses will produce an output from the primary windings of constant frequency A.C. potentials for many seconds, even up to 30 seconds or more for 50 to 60 Hz generator units.

Figure 4:
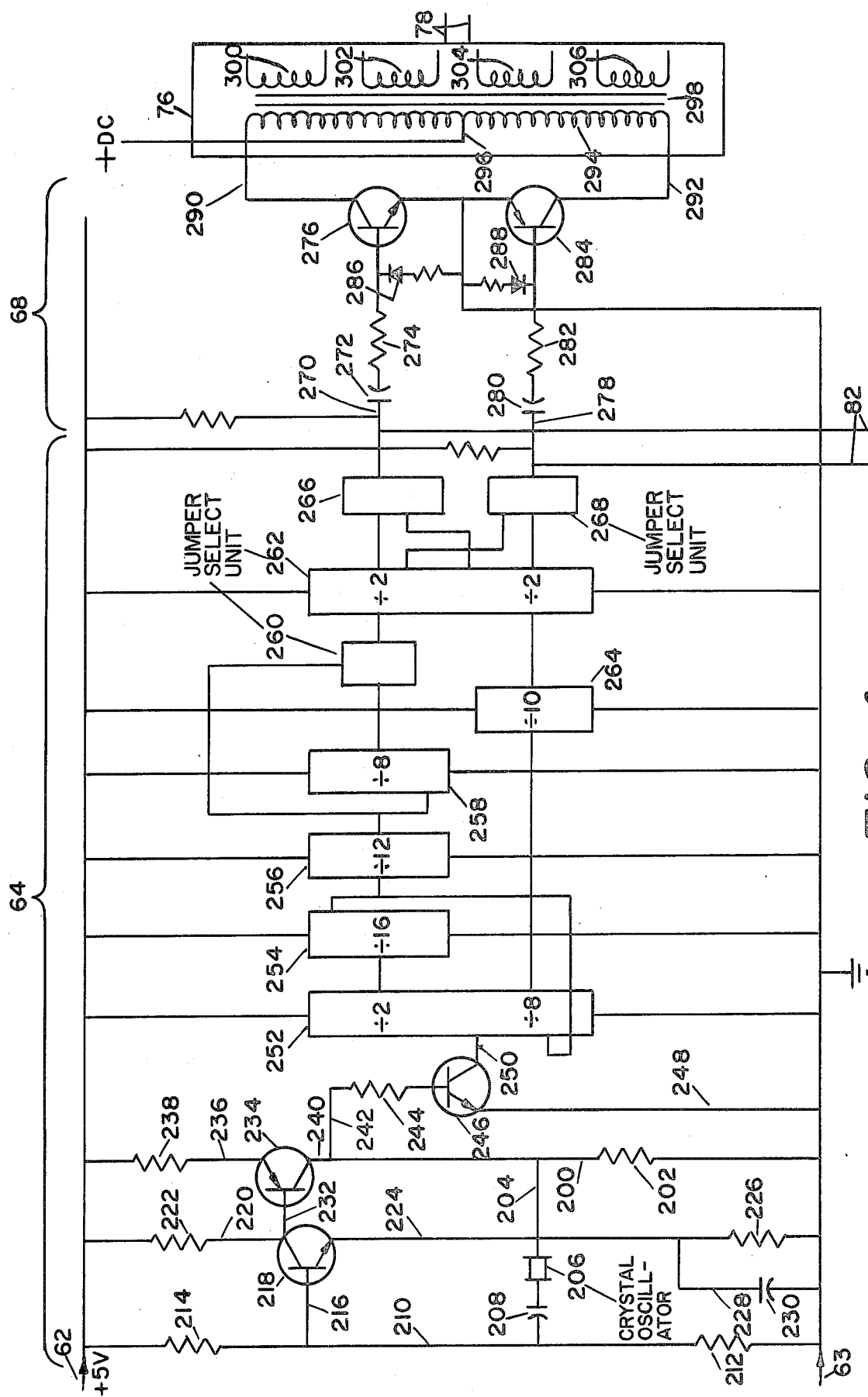
FIG. 4 is a circuit diagram of an oscillator divider and driver unit.

The power supply unit 60 rectifies the A.C. potential supplied by leads 59 and conveys direct current at a suitable voltage by line 62 to an oscillator divider 64, which produces regular unidirectional complementary square wave timing pulses which are conveyed by lead 66 to a master driver 68. The identical pulsating timing pulses are conveyed from the oscillator divider 64 by line 82 to a voltage regulating phase shift unit 84. A detailed circuit diagram of the oscillator divider 64 and the master driver 68 is shown in FIG. 4. The regular unidirectional complementary square wave timing pulses from the oscillator divider 64 correspond to a desired selected frequency, 50 Hz, 60 Hz or 400 Hz, for example, and when they are fed to the master driver they are employed with direct current furnished by line 70 from the power supply unit 60 to produce square wave complementary control potential pulses of the selected frequency, which is supplied to a master D.C. to A.C. inverter 76 which generates from direct current supplied by line 71 an A.C. potential of the selected frequency to be conveyed by conductors 78 in a resonant circuit including a capacitor 80 and the excitation coil 22 of master generator 12.

In the phase shift unit 84 the regular unidirectional complementary square wave timing pulses supplied by line 82 are shifted by an appropriate amount as determined by a voltage sensing and comparing means. Briefly, winding 58 coupled with the primary 56, which preferably carries only single phase A.C., develops a potential corresponding to the voltage in winding 56 and this potential is supplied by conductor 88 to a comparator means in the phase shift unit 84, which comparator means generates an electrical error signal proportional to the difference between this voltage and a selected desired voltage, and the electrical error signal is caused to shift the regular unidirectional complementary square wave timing pulses received from line 82 in proportion thereto. The phase shifted regular unidirectional complementary square wave timing pulses are supplied by line 90 to a slave driver unit 92 concurrently with direct current from the power supply unit 60 conveyed by line 94, and the slave driver combines them into phase shifted unidirectional complementary square wave pulses that are fed into a D.C. to A.C. slave inverter 98 concurrently with direct current via line 100, the inverter output is the desired phase shifted A.C. potential which is conveyed to excitation coil 40 in a resonant circuit with conductor 102 and capacitor 104.

Figure 2:
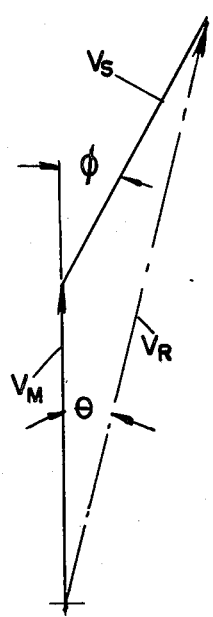
FIG. 2 is a vectorial diagram of the resultant voltage of two A.C. generators with the slave generator being out of phase with the master generator.

The series output of generators 12 and 30 results in a resultant sine wave, whose peak voltage and position with respect to the phase position of the peak voltage of the output of generator 12, is the vectorial sum of the voltage outputs of the master and slave generator voltages as is shown in FIG. 2. The voltage vector $V_M$ of the master generator 12 is in a vertical direction, while the voltage vector $V_s$ of the slave generator 30 is at an angle $\phi$, which is the amount of the phase shift, with respect to that of $V_M$. The resultant total voltage is $V_R$, with the peak of the vector $V_R$ lagging the peak of vector $V_M$ by an angle $\theta$ which is less than $\phi$.

Figure 3:
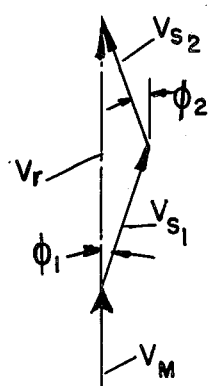
FIG. 3 is a vectorial diagram of the resultant voltages of three generators, two being slave generators.

If there are two relatively small slave generators of equal voltage output in series with a larger master generator, then it is often desirable that the phase shift angle $\phi$ of the frequency be leading for one of the slave generators, while the other may be lagging. When connected in series the resultant voltage output of the three generators adds vectorially as shown in FIG. 3. The peak voltage vector $V_M$ of the master generator is in a vertical direction, while the first slave generator's peak voltage vector $V_{s1}$ lags by the phase shift angle $\phi_1$ and the peak voltage vector $V_{s2}$ of the second slave generator leads by the angle $\phi_2$, so that the total resultant peak voltage vector $V_r$ is in phase with that of the master generator.

In both FIGS. 2 and 3, the angle $\phi$ can be changed by the electronic means to any extent, i.e. between 0° and 180°, but from a practical standpoint it is so designed and arranged that this angle should be at least about 10° and not in excess of about 170°. For the case of two generators of the same size, the resultant peak voltage can be varied from a magnitude of slightly less than twice $V_M$ to a small fraction thereof, for example, as low as about 10 volts and up to about 430 volts for two 220 volt generators.

Referring to FIG. 4 of the drawing, there is shown in detail the circuitry of one suitable oscillator divider 64, a driver means 68 operatively connected thereto, and a portion of the circuit of the master D.C. to A.C. inverter 76, which co-operate to provide the desired frequency to the excitation coil and thereby determine the frequency of the resultant A.C. potential of the generator system 10. Direct current at a positive 5 volts, for example, is supplied by line 62 from the power supply unit 60, with the circuit being completed by line 63 at ground potential. Potential flows through leads 200 and 204 connected to the ground 63 through a resistance 202 to a crystal oscillator 206 which generates oscillations of a frequency of preferably less than one megacycle. Capacitor 208 in series with the oscillator 206 provides a feedback through leads 210 and 216 to an NPN transistor 218 cascaded with a PNP transistor 234, which reinforce and amplify the oscillations. Lead 210 is provided with resistors 212 and 214 near its junction with line 62 and 63, respectively. The collector of transistor 218 receives positive direct current via lead 220 and resistance 222, while the emitter is connected by lead 224 to line 63 by a resistance 226 and a parallel lead 228 with a capacitance 230. The emitter of transistor 234 is supplied direct current from line 62 by a lead 236 and resistance 238. The reinforced and amplified oscillations in a line 240 from the collector of transistor 234 joined to leads 200-204 are conveyed by lead 242 and resistance 244 to a buffer NPN transistor 246 whose emitter is connected to line 63 by a conductor 248, while the desired oscillating electrical current is passed by a lead 250 from the collector thereof to the divider portion, which comprises conventional divider components 252, 254, 256, 258, 262 and 264 arranged and connected as shown. Jumper select units, also commonly designated as connector switches, 260, 266 and 268 are present in the circuit and are preset to enable a selection of a frequency of 50 Hz, 60 Hz or 400 Hz output, which would be commonly called for, at the terminals 270 and 278, and is desired. Of course, any other frequency could be selected and obtained by using a suitable frequency oscillator crystal and divider arrangement.

The output terminals 270 and 278 of the oscillator divider 64 convey the desired selected frequency control signal pulses, which comprise unidirectional complementary square wave pulses, to the master driver 68. The output terminals 270 and 278 are also connected to the line 82 which supplies the identical frequency control signal pulses to the phase shifter 84, which produces an output of phase shifted frequency control pulses to the slave driver 92. Unidirectional complementary square wave pulses pass from terminal 270 through capacitor 272 and resistor 274 to the base of an NPN transistor 276, and from terminal 278 through a capacitor 280 and a resistance 282 to the base of a PNP transistor 284. A resistor and rectifier 286 from the ground line 63 are joined to the base of transistor 276, and a similar resistor and rectifier 288 from ground line 63 are joined to the base of the transistor 284. The emitters of transistors 276 and 284 are also grounded to line 63. The collector of transistor 276 is connected to one terminal of a primary winding 294 of a transformer in the master D.C. to A.C. inverter 76, while the collector of the transistor 284 is joined to the other terminal. The primary winding 294 has a center tap which is connected by line 296 to a source of positive direct current at, for example, 12 volts. The inverter 76 has the customary four secondary windings 300, 302, 304 and 306 which are connected to four transistors in the well known bridge configuration (See FIG. 10C of U.S. Pat. No. 3,931,535) and generate an A.C. output of the same frequency as the unidirectional complementary square wave pulses supplied by terminals 270 and 278, but at a substantial amperage, as for instance two to six amperes, which is delivered to leads 78 connected to the excitation coil 22.

Figure 5:
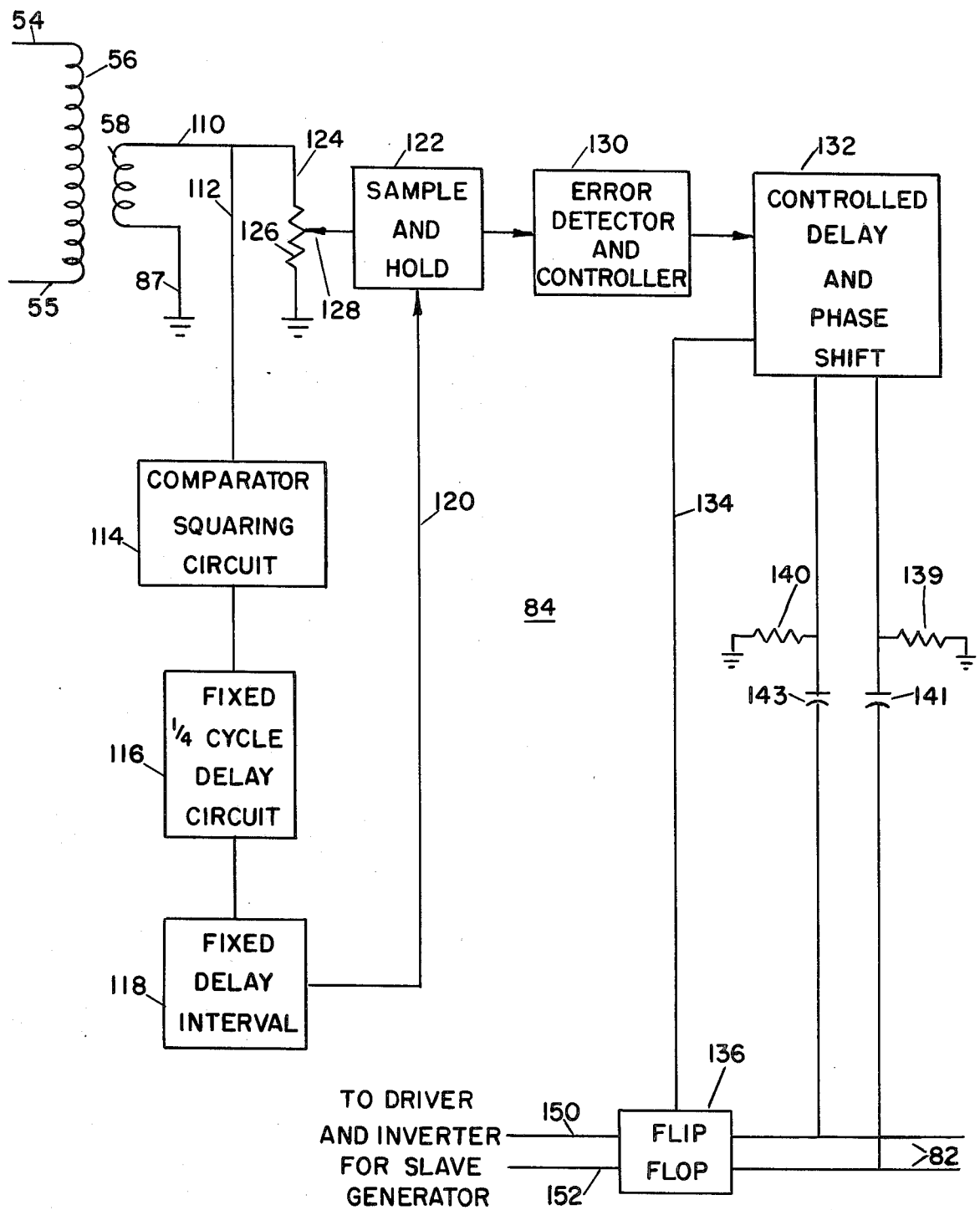
FIG. 5 is a block circuit diagram of the voltage sensing and phase shifting components.

A block diagram showing the components and more circuit details of the phase shift unit 84 is set out in FIG. 5. The secondary winding 58 senses the voltage of the single phase A.C. in primary winding 56, which latter is directly connected by leads 54 and 55 to the series connected output of the generators 12 and 30. The one terminal of winding 58 is connected to ground by lead 87, while the other terminal 110 of secondary winding 58 has one branch 112 going to a comparator squaring circuit unit 114, which, at the time the A.C. potential loop goes from a negative value through zero, triggers a square wave to a set positive maximum potential value for its output. This square wave with a set positive potential value is supplied to a fixed ¼ cycle delay circuit unit 116 which is preset for the desired frequency A.C. for the generator system 10. Thus for 60 Hz output, it functions after a 1/240th second delay from the moment the square wave arrives from unit 114 and at this time after the zero value of the A.C. cycle, the potential drops to zero. The square wave abruptly dropped to a zero value after a ¼ cycle period in unit 116 is supplied to a fixed delay interval unit 118 which is so operable that it applies a short selected interval of from about 5 to 15 microseconds to elapse from the time the square wave dropped to zero in unit 116, and then restores the square wave potential back to its original maximum value. This, in effect, creates an interval or window in the square wave of from about 5 to 15 microseconds. The square wave with this window is conveyed by line 120 to a sample and hold unit 122. Sample and hold unit 122 is continuously supplied line voltage from terminal 110 by means of a lead 124 conveying the voltage through a variable resistance 126 and contact 128. The sample and hold unit 122 is so constructed that it will only measure the potential coming in from contact 128 at the brief interval that the window is present in the square wave reaching it by line 120. The window interval is selected to practically coincide with the horizontal portion of the peak of the positive loop of the A.C. cycle from the generators 12 and 30 and is of such short duration that there is no material change in the voltage. The sample and hold unit 122 retains the measured peak voltage in each cycle of the A.C. potential output of the generators, until the next cycle is being measured. The measured peak voltage is a steady positive direct current which is then conveyed to an error detector and controller unit 130, which compares the direct current coming from unit 122 with a selected voltage value desired for the combined voltage of the generators' output, and if there is any difference therefrom over an acceptable range, it causes an appropriate control signal to be furnished to an electronic controlled delay and phase shift unit 132. In response to such control signal from unit 130, output signals are generated in unit 132 and they are conveyed by line 134 to a flip-flop unit 136 which produces unidirectional complementary square wave pulses conveyed by lines 150 and 152 to the driver 92 from which signals go to the inverter 98 for the slave generator. The phase shift unit 132 receives the unidirectional complementary square wave pulses, which are also being supplied to the driver 68 for the master generator, by the RC networks 139–141 and 140–143, which are connected to lines 82 from the master driver unit 68. In this manner the phase shift unit correlates the phase shift angle $\phi$ to the phase of the square wave pulses derived from the master D.C. to A.C. inverter.

Figure 6:
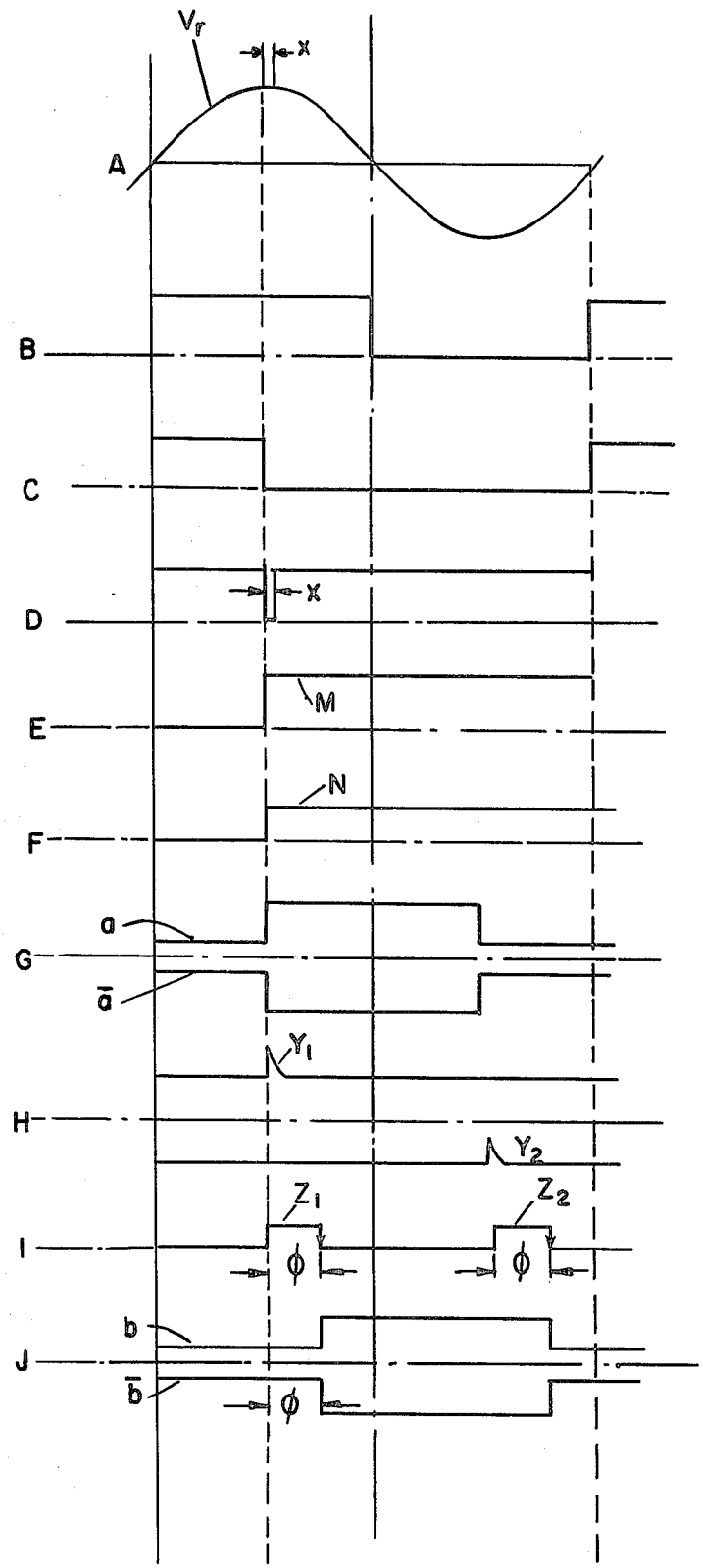
FIG. 6 is a timing chart showing the electrical outputs for the several components of FIG. 5.

Referring to FIG. 6 of the drawing, there is shown a series of electrical potential curves plotted for one cycle of the resultant sine wave A.C. potential output $V_r$ of the generator system 10 as seen in Graph A, for the several components of the circuit of FIG. 5. Graph B is a curve of the square wave generated by the comparator squaring circuit 114, the square wave rising from a zero value to its full voltage when the sine wave $V_r$ passes through zero in going from a negative value, and dropping to a zero value when the sine wave $V_r$ passes through zero and becomes negative. Graph C is the potential curve of the square wave when it is modified by the input of the fixed one-quarter cycle delay circuit unit 116. It will be obvious that the square wave drops to a zero value at the one-quarter cycle point of curve $V_r$. The effect of the input of the fixed delay interval circuit 118 is evident in Graph D wherein after the several microsecond delay interval X, the square wave is caused to go back to its preceding full potential value which it retains until the next cycle. Graph E shows the effect of the potential during interval X of Graph D when it activates the operation of the sample and hold circuit components 122. As shown in Graph A, the X interval coincides with the relatively horizontal portion of the voltage peak of the curve $V_r$ and this value is sensed and retained as the potential value M which is directly proportional to the sensed peak voltage of $V_r$. When potential M is compared with a selected desired voltage by the circuit components in the error determining unit 130 of FIG. 5, any difference is determined and compared to preset limits and, if such difference is outside of these limits, will cause a control voltage N to be developed as is shown in Graph F. The Graph G shows curves a and $\bar{a}$ of the unidirectional complementary square wave pulses generated in the oscillator divider 64 and going to the master driver 68, which pulses are also conveyed to the controlled delay and phase shift component 132 via the RC differentiator networks 139–141 and 140–143 to generate brief trigger pulses $Y_1$ and $Y_2$ as depicted in Graph H, where the $Y_1$ trigger pulse is produced at the rising voltage front of curve a and the $Y_2$ trigger pulse is produced at the potential change at the end of curve $\bar{a}$. The phase shift circuit means in unit 132, combines the $Y_1$ and $Y_2$ trigger pulses with the amplified error voltage signal N to generate delay pulses $Z_1$ and, as depicted in Graph I, which start at $y_1$ and $\bar{y}_2$ respectively, and after a delay interval $\phi$ generate another trigger pulse which energizes the flip-flop circuit unit 136 to generate delayed unidirectional complementary square wave pulses b and $\bar{b}$, as depicted in Graph J, which energize the slave driver 92.

Figure 7A:
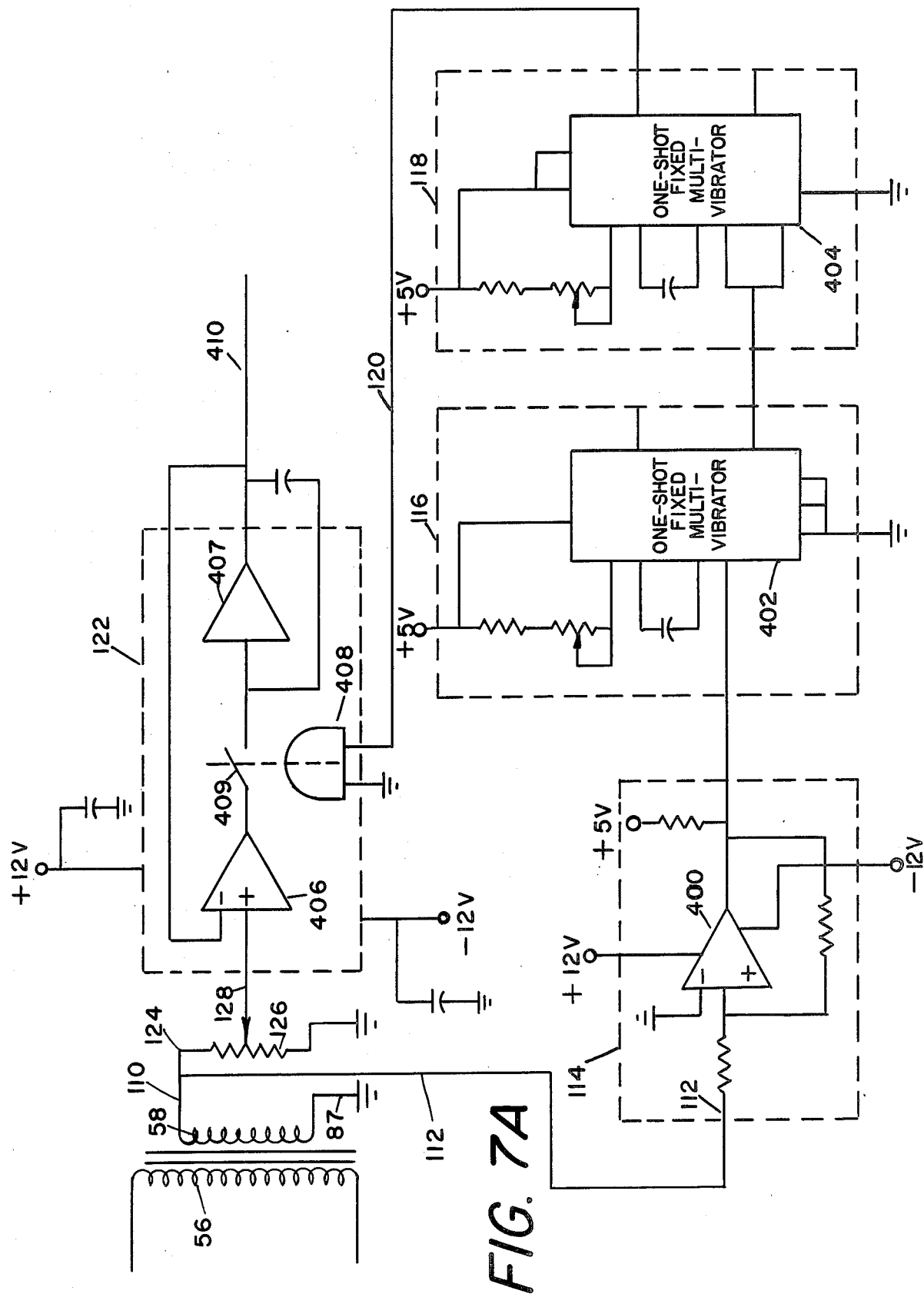
FIGS. 7A and 7B are a detailed circuit diagram of the components of FIG. 5.
Figure 7B:
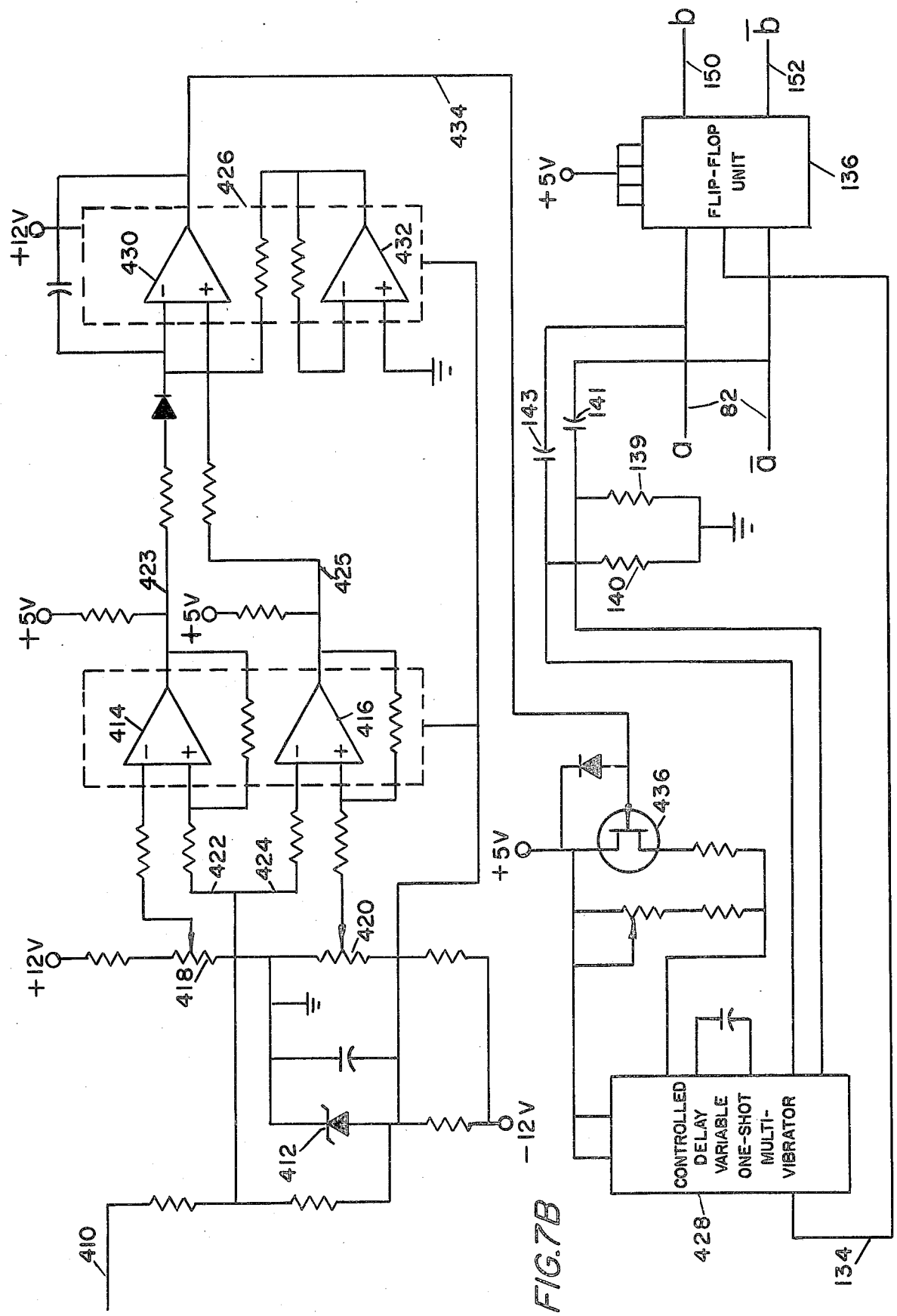

Referring to FIGS. 7A and 7B, which should be viewed as joined together as a single figure through lead 410, there are shown details of the block diagram electrical circuit of FIG. 5. Winding 58 is energized by one phase of the resultant A.C. output in winding 56 from the series connected windings of generators 12 and 30, so that winding 58 has A.C. sine waves identical with those in winding 56 and the peak voltage of the sine waves in winding 58 is directly proportional thereto. Line 112 conveys this A.C. sine wave to the comparator squaring circuit unit 114 which comprises an op amp member 400, which is supplied D.C. at $+12$ and $-12$ volts, derived from the power supply unit 60, and when the sine wave passes from a negative value through zero the comparator 400 generates a square wave. The comparator is a commercially available electronic component, for example under the designation LM 339. The square wave passes to the fixed one-quarter cycle delay circuit unit 116 which comprises a one-shot fixed multivibrator 402, and the multivibrator 402 is selected and adjusted to function after a one-quarter cycle of the sine wave to cause the square wave to go to zero value. The square wave is conveyed from the unit 116 to the fixed delay unit 118 which comprises a second one-shot fixed multivibrator 404 which is adjusted to function after a selected brief interval of the order of microseconds. It will restore the square wave to its original full potential and the square wave with a brief zero delay interval therein is carried by line 120 to the sample and hold unit 122. Both multivibrators 402 and 404 are readily commercially available types of integrated circuit components.

The sample and hold unit 122 comprises two op amp units 406 and 407 and a gated analog switch 409 cooperating with a gate 408, which together is commercially available as an AD 582 intergrated circuit sample and hold component. The op amp unit 406 is supplied the sine wave line voltage from terminal 110 via line 124, variable resistance 126 and contact 128. The gate 408 receives from line 120 the square wave signal with the delay interval therein and the signal activates the op amp unit 406 precisely at this delay interval to sense the line voltage at the sine wave peak and to generate a direct current potential proportional to the peak voltage so sensed. The direct current continues to flow at this sensed peak potential value after the square wave returns from a zero value until the next square wave with a brief zero delay interval arrives.

A lead 410 carries the direct current potential from the sample-and-hold unit 122 of FIG. 7A to a voltage reference diode 412 as shown in FIG. 7B, which is disposed in a circuit energized with direct current, for example, at $+12$ and $-12$ volts. Two limit comparators 414 and 416 are energized with this direct current by two adjustable variable resistors 418 and 420 so that the desired upper and lower voltage limits are supplied to the comparators 414 and 416, respectively. The direct current potential is conveyed by line 410 to a lead 422 to the comparator 414, and a lead 424 to comparator 416. The two comparators comprise commercially available intergrated circuit electronic components such as an LM 339. If the voltage conveyed by lead 422 to the upper comparator 414 is in excess of the limit set on the comparator by resistor 418, then the comparator generates a ramp down signal, while if the voltage conveyed by lead 424 to comparator 416 is below the limit set by resistor 420, it will generate a ramp up signal. If the voltage conveyed by line 410 to both comparators is between these limits, then the potential outputs of both comparators are low. The ramp up, ramp down or the low potential outputs of the comparators 414 and 416, are carried by leads 423 and 425 to a ramp-and-hold unit 426, which comprises a pair of op amp circuit units 430 and 432, these being commercially available as LM 3900 units (Norton OP Amp). The op amp circuit units 430 and 432 hold their output values if both inputs from leads 423 and 425 are low, but if the ramp up or ramp down inputs are raised above a threshold value, then the op amp unit 430 will raise its output voltage linearly if the ramp up signal from unit 416 is high, and the op amp unit 430 will lower its output voltage linearly if the ramp down signal is high. The op amp unit 432 functions as a temperature stabilizing op amp for the assembly.

The net signal output from the ramp-and-hold unit 426, is carried by a line 434 to the gate of a field effect transistor 436 which has a high input impedance and is the only load on the output of unit 426, and accordingly it will hold its output voltage quite well, and as a consequence the field effect drain current will be controlled between nearly full conduction and cut off. The drain current from the field effect transistor 436 is conveyed to a controlled delay variable one-shot multivibrator unit 428 which comprises, as a component, the usual capacitor whose charge time is controlled by the current flowing from the field effect transistor 436, and this controls the delay period of the multivibrator unit 428. The multivibrator unit 428 is triggered by the leading edge of each half cycle of the unidirectional complementary square wave pulses (See FIG. 6—Curve G) of the master driver drive signals a and $\bar{a}$ conveyed by lines 82, so that a pulse is initiated at each half cycle, and the width of each pulse is controlled by the magnitude of the A.C. voltage being sensed from the master generator output. The trailing edge of this pulse flips the output of the flip-flop unit 136 at the delay time as controlled by the magnitude of the A.C. voltage thus sensed in the multivibrator 428 and is carried from it as an electrical signal in the line 134 going to the flip-flop unit. A reduced sensed voltage results in a decreased delay period, while an increased sensed voltage causes an increased delay period. The flip-flop unit 136 produces delayed drive signals which pass via lines 150 and 152 to the driver and inverter for the slave generator.

The circuitry of FIGS. 7A-7B when combined with generators 12 and 30 and their respective drive circuits, comprises a closed loop control system to regulate the resultant voltage of the generator system. The advantage of the ramp-and-hold circuit is that the control signals controlling the phase shift as they pass through the field effect transistor change slowly, at a rate which can be chosen by the design of the circuitry, and this eliminates hunting and jitters in the phase shift in other circuit components which would normally result if high-gain amplifiers were employed to control the field effect transistor. Variations in gain or other characteristics of the individual elements in the closed loop are readily accommodated by the limit sensing and ramp technique. The upper and lower limits of the comparators 414 and 416 can be readily increased or reduced to give either a wider or narrower regulated range.

It will be apparent that while the electronic means of FIGS. 7A and 7B for phase shifting of the A.C. potentials being furnished by the D.C. to A.C. inverter to the excitation coil of the slave generator causes a lagging phase shift, the electronic means can be readily modified and connected so as to produce a leading phase shift. In either case the resultant A.C. potential series outputs of both the master and slave generators will be of the same peak voltage value.

In accordance with the present invention, a generator system comprising two 400 Hz, three phase master and slave generators of equal A.C. voltage output (75 volts) were produced. In various tests thereon, no difficulty was encountered in producing therefrom resultant combined A.C. voltages within a range of from 30 to 150 volts (RMS), and any selected voltage was easily maintained at a desired value despite adding and dropping a load. The lower resultant voltage level could have been set as low as a few volts.

We claim:

1. A generator system for producing sine wave A.C. of a substantially constant selected frequency and of a substantially constant selected voltage, comprising a rotating master generator for generating a sine wave A.C. potential of a substantially constant selected frequency, at least one other rotating slave generator for generating sine wave A.C. of an identical frequency to that of the master generator, the A.C. potential output of the master generator being combined in series with that of the said other slave generator, electrical means for phase shifting of the A.C. potential output of the slave generator with respect to that of the master generator so that the combined A.C. potentials of both generators is a sine wave A.C. having the selected voltage.

2. The generator system of claim 1, wherein the rotating master generator and the other rotating slave generator each comprise at least one field core of a high permeability soft magnetic material with a surface thereof, having a layer of magnetizable permanent material thereon, a stator operatively juxtaposed to each of said field cores, each stator comprising a slotted core of high permeability soft magnetic material, an excitation coil being disposed in a few slots in each stator core, means for energizing each excitation coil with an A.C. potential of an identical frequency to that of the selected frequency, whereby the layer of permanent magnetic material on each of the juxtaposed rotating field cores is magnetized by the adjacent excitation coil into a pattern of magnetization, corresponding to the A.C. potential of that excitation coil, primary windings in the other slots of each stator core for generating an A.C. potential when the magnetized field cores rotate with respect to the wound stators, and the means for phase shifting causes the A.C. potential energizing the excitation coil in the stator of the slave generator to be shifted in phase a predetermined amount with respect to the phase of the energizing A.C. potential supplied to the excitation coil in the master generator, whereby the A.C. potentials generated by the primary windings in the stators of the master and slave generator are out of phase by an amount such that the combined resultant A.C. voltage is the selected voltage.

3. The generator system of claim 2, wherein there are only two generators in the system and the master generator and the slave generator generate nearly the same A.C. voltage.

4. The generator system of claim 2, wherein there are at least two slave generators each generating substantially equal A.C. potentials substantially smaller than the A.C. potential generated by the first generator, one of the slave generators leading and the other lagging the phase of A.C. of the master generator.

5. The generator system of claim 2, wherein the means for energizing each excitation coil comprises a common oscillator divider means producing electrical signals of a selected frequency, being supplied to and controlling a master driver means connected to a master D.C. to A.C. inverter means producing an A.C. potential at the selected frequency to be supplied to the excitation coil in the master generator, said common oscillator divider means also supplying electrical signals of the identical selected frequency to a controllable phase shift means for shifting the signals so supplied a predetermined amount, the resulting phase shifted signals being applied to a slave driver means which supplies electrical signals to a slave inverter means, for producing an A.C. potential at the identical selected frequency as supplied to the first excitation coil, but phase shifted by the predetermined amount and supplying said phase shifted A.C. potential to the excitation coil in the slave generator.

6. The generator system of claim 5, wherein the phase shift means comprises means for sensing the resultant of the combined voltages of the generators, means responsive to the amount and the direction that the resultant combined voltage varies from the selected voltage to delay by an amount proportioned to such variation from the selected voltage, the electrical signals from the oscillator driver means before they are supplied to the slave driver means and then to the slave D.C. to A.C. inverter means.

7. In a voltage control system for combining in series the outputs of a master generator and at least one slave generator each producing sine wave A.C. potentials of an identical frequency, means for determining the peak voltage of the combined sine wave A.C. voltage output of the generators for a brief interval at one-quarter of a wave length after the zero point thereof, means for comparing such peak voltage with a selected voltage and for producing an electrical signal proportional to the difference therebetween, supplying such electrical difference signal to means for causing the phase of the sine wave A.C. potential output of the slave generator to be shifted by an amount proportional to said signal with respect to the sine wave A.C. potential output of the master generator, whereby the resultant combined series voltage is substantially the selected voltage.

8. The voltage control system of claim 7, wherein the means for determining the peak voltage of the combined sine wave voltage output measures the peak voltage of only one sine wave of each consecutive group of a predetermined number of successive sine waves.

9. The voltage control system of claim 7, wherein the said electrical difference signal is supplied to a controlled delay means, which concurrently receives A.C. control potentials of the identical selected frequency being furnished to the means for causing the master generator to produce a sine wave A.C. potential output, and the controlled delay means phase shifts the control potentials received by it by an amount proportioned to the electrical difference signal and supplies the shifted A.C. control potentials to the means for causing the slave generator to produce phase shifted sine wave A.C. potential outputs.

10. The voltage control system of claim 9, wherein both the A.C. control potentials being furnished to the master generator and the phase shifted A.C. control potential being furnished to the slave generator are conveyed to means for energizing excitation coils in stators in each of the generators, and each excitation coil develops an alternating magnetic field which produces a pattern of magnetization in a layer of magnetizable permanent magnetic material in a field core juxtaposed with each stator, whereby the so magnetized field core induces in primary power generating windings in each stator, a sine wave A.C. potential output identical in frequency and phase with the A.C. control potentials supplied to it.

11. The voltage control system of claim 7, wherein there are three generators, and the means for causing the phase shifting produces a leading phase shift in the sine wave A.C. potential output of one of the slave generators and a lagging phase shift of a substantially equal amount in the sine wave A.C. potential output of another slave generator, in both cases the phase shift being with respect to the sine wave A.C. potential output of the master generator, and the potentials of both of the slave generators being substantially equal whereby the resultant series combined A.C. potential output of all three generators is substantially in phase with that of the master generator.

12. The voltage control system of claim 10, wherein the means for determining the peak voltage comprises a square wave generator means operable to generate a square wave when the resultant combined sine wave A.C. potential output reaches a zero point after a negative loop, associated therewith a fixed delay circuit means preset to function after one-quarter passage of the sine wave after the zero point to cause the square wave to drop to a zero value, and a fixed delay interval means connected thereto operable after an interval of the order of microseconds at such zero value to cause the square wave to assume its original value, a sample and hold means receiving said square wave and operable during said interval of the order of microseconds to measure the peak voltage of the resultant sine wave A.C. potential and to produce and hold an electrical signal proportional to said measured peak voltage, comparing means for receiving said electrical signal and determining any difference thereof with respect to a desired selected voltage and generating an electrical difference signal proportioned to any difference therebetween, controllable delay means connected to the comparing means and operable by the electrical difference signal to cause a phase shift in an amount corresponding to the electrical difference signal of a first pulsed control potential being concurrently supplied to a first D.C. to A.C. inverter, whereby to produce a phase shifted pulsed control potential to be supplied to a second D.C. to A.C. inverter, the A.C. potential output of the first inverter being furnished to the excitation coil of the master generator and the output of the second inverter being phase shifted A.C. potential furnished to the excitation coil of the slave generators.

13. The voltage control system of claim 12, wherein said comparing means comprises a presettable voltage selecting means, an electronic sensing means receiving the measured peak voltage electrical signal and also energized by a preset selected voltage from the voltage selecting means, adjustable means associated with the sensing means for setting an upper and lower limit about the preset selected voltage to define a narrow range of voltages, whereby when the electronic sensing means receives a measured peak voltage electrical signal within said range of voltages it will not generate any effective electrical difference signal, but the electronic sensing means will generate either a ramp down electrical difference signal if the measured peak voltage electrical signal exceeds the said upper voltage limit or a ramp up electrical difference signal if the measured peak voltage signal exceeds the said lower voltage limit, and the controllable delay means is energized by either a ramp up or ramp down electrical difference signal to reduce or increase the phase shifting of the pulsed control potential being supplied to the second D.C. to A.C. inverter.

* * * * *